(12) United States Patent
Komatsu

(10) Patent No.: US 7,510,310 B2
(45) Date of Patent: Mar. 31, 2009

(54) VEHICLE LIGHTING DEVICE

(75) Inventor: Motohiro Komatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 15 days.

(21) Appl. No.: 11/641,851

(22) Filed: Dec. 20, 2006

(65) Prior Publication Data

US 2007/0147055 A1    Jun. 28, 2007

(30) Foreign Application Priority Data

Dec. 28, 2005    (JP)    ............................. 2005-379702

(51) Int. Cl.
*B60Q 1/00*    (2006.01)
(52) U.S. Cl. ................................... 362/466
(58) Field of Classification Search ......... 362/464–466, 362/514
See application file for complete search history.

(56) References Cited

U.S. PATENT DOCUMENTS

| | | | |
|---|---|---|---|
| 5,645,338 A | * | 7/1997 | Kobayashi ................... 362/466 |
| 6,543,910 B2 | * | 4/2003 | Taniuchi et al. ............. 362/297 |
| 6,543,922 B2 | * | 4/2003 | Komatsu et al. ............ 362/518 |
| 6,572,248 B2 | * | 6/2003 | Okuchi et al. ............... 362/464 |
| 6,729,749 B2 | * | 5/2004 | Kondo et al. ................. 362/466 |
| 6,919,820 B2 | * | 7/2005 | Makita et al. ................ 340/903 |
| 2006/0023465 A1 | * | 2/2006 | Ohshio et al. ............... 362/514 |

FOREIGN PATENT DOCUMENTS

| | | |
|---|---|---|
| JP | 2004-95480 A | 3/2004 |
| JP | 2004-95481 A | 3/2004 |

* cited by examiner

*Primary Examiner*—Anabel M Ton
(74) *Attorney, Agent, or Firm*—Sughrue Mion, PLLC

(57) ABSTRACT

A vehicle lighting device includes a light source unit for emitting light for forming a high beam light distribution pattern by projecting forward light from the light source unit. The high beam light distribution pattern has at least two illumination patterns which illuminate areas which are different from each other. A control unit is provided for controlling the at least two illumination patterns to be turned on and off selectively.

16 Claims, 15 Drawing Sheets

CURB ILLUMINATION PATTERN ILLUMINATING A CURB SIDE OF A LANE ON WHICH THE SUBJECT VEHICLE IS BEING DRIVEN IS ADDED AS REQUIRED

LOW BEAM EQUILUMINOUS CURVE DIAGRAM

VEHICLE LIGHTING DEVICE

CROSS-REFERENCE TO RELATED APPLICATIONS

This application claims priority to Japanese Patent Application No. 2005-379702, filed Dec. 28, 2005, in the Japanese Patent Office. The priority application is incorporated by reference in its entirety.

BACKGROUND OF THE INVENTION

1. Field of the Invention

The present invention relates to a vehicle lighting device which forms a high beam light distribution pattern by directing light emitted from a light source unit to travel forward, and more particularly to a technique which increases the visibility without dazzling the drivers of a preceding vehicle and an oncoming vehicle.

2. Description of the Background Art

A projector type lamp unit provided in a headlight which is an automotive lamp typically includes a light source for emitting light, a reflector for reflecting the light from the light source, a projection lens for projecting forward the light reflected by the reflector, a holder which fixes the projection lens in place relative to the reflector, and a shade for interrupting the passage of part of the light traveling from the reflector to the projection lens. During driving at night, the headlight is preferably set to a high beam when there is no vehicle being driven ahead of the subject vehicle and to a low beam when there is a vehicle being driven ahead thereof depending on a distance to the preceding or oncoming vehicle in order not only to improve the visibility of the driver of the subject vehicle but also to give no glare to the driver of the preceding or oncoming vehicle.

Among projector type headlamps, there are headlamps which can emit both a high beam and a low beam. In a projector type headlamp of this type, a shade is supported on a holder via rotational pins, whereby the shade is allowed to rotate around a horizontal axis which connects both the rotational pins between a low beam forming position and a high beam forming position.

When situated in the low beam forming position, the shade interrupts the passage of part of the reflected light from the reflector so as to remove an upwardly directed light emitted from the lamp unit to thereby obtain a low beam forming light which is projected downwardly. In one example, a low beam light distribution pattern is formed which has a Z-type cut-off line which is staggered in a horizontal direction.

When situated in the high beam forming position, the shade cancels the interruption of the passage of the reflected light from the reflector so as to permit the emission of the upwardly directed light from the lamp unit, whereby the light is allowed to be emitted toward an area above the cut-off line to form a high beam light distribution pattern which improves the visibility in a far field area.

In a conventional automotive lamp, only a single high beam light distribution pattern was obtained by a high beam forming light. Consequently, an elaborate formation of suitable illumination areas for various vehicle driving conditions is difficult. Namely, in the event that there are no pedestrians and no preceding and oncoming vehicles ahead of the subject vehicle, by forming the conventional high beam light distribution pattern, a good visibility in a far field area is secured, while no other parties are dazzled. However, in the event that there are pedestrians and oncoming vehicles, there have been cases where the pedestrians and oncoming vehicles are somewhat dazzled depending on an environment where the subject vehicle is being driven. In addition, in the event that there is a preceding vehicle ahead of the subject vehicle, although the high beam is not normally switched on, the driver of the subject vehicle wishes to be able to see pedestrians on a side of a road. In such a case, in the event that the high beam is turned on, the driver of the preceding vehicle is dazzled.

The invention was made in view of these situations, and an object thereof is to provide a vehicle lighting device which can set an optimum high beam illumination area according to the presence of a pedestrian and a preceding vehicle or an oncoming vehicle which is being driven right ahead of the subject vehicle, so as to realize an increase in the visibility of the pedestrian and a reduction in the possibility of dazzling the pedestrian, preceding vehicle, and oncoming vehicle.

SUMMARY OF THE INVENTION

In one aspect, the present invention relates to a vehicle lighting device including a light source unit for emitting light, whereby light emitted from the light source unit is made to travel forward to form a high beam light distribution pattern. The high beam light distribution pattern has at least two illumination patterns that are different from each other. A control unit is provided for controlling the at least two illumination patterns to be selectively turned on and off.

In another aspect of the invention, the vehicle lighting device as set forth above may further include a detector for detecting an object which lies in front of the subject vehicle. The control unit may control the at least two illumination patterns to be selectively turned on and off according to a detection result of the detector.

In another aspect of the invention, the at least two illumination patterns may include a leftward illumination pattern which is projected toward a left front of the vehicle lighting device and a rightward illumination pattern which is projected toward a right front of the vehicle lighting device. The control unit may control the leftward illumination pattern and the rightward illumination pattern to be selectively turned on and off according to a detection result of the detector.

In another aspect of the invention, in the event that the detector detects an oncoming vehicle which is situated obliquely forward of the subject vehicle, the control unit may turn off either of the leftward illumination pattern and the rightward illumination pattern.

In another aspect of the invention, the light source unit may include a primary light emitting element for emitting light which is projected toward the left of the vehicle so as to form the leftward illumination pattern and a secondary light emitting element for emitting light which is projected toward the right of the vehicle so as to form the rightward illumination pattern.

In another aspect of the invention, the at least two illumination patterns may include a leftward illumination pattern which is projected toward a left front of the vehicle lighting device, a rightward illumination pattern which is projected toward a right front of the vehicle lighting device, and a central illumination pattern which is projected between the leftward illumination pattern and the rightward illumination pattern. The control unit may control the leftward illumination pattern, the rightward illumination pattern and the central illumination pattern to be selectively turned on and off.

In another aspect of the invention, the control unit may turn off either of the leftward illumination pattern and the rightward illumination pattern in the event that the detector detects an oncoming vehicle which is situated obliquely forward of the subject vehicle.

In another aspect of the invention, the control unit may turn off the central illumination pattern in the event that the detector detects a preceding vehicle which is situated directly ahead of the subject vehicle.

In another aspect of the invention, the light source unit may include a primary light emitting element for emitting light which is projected toward the left of the vehicle so as to form the leftward illumination pattern, a secondary light emitting element for emitting light which is projected toward the right of the vehicle so as to form the rightward illumination pattern, and a tertiary light emitting element for emitting light which is projected between the leftward illumination pattern and the rightward illumination pattern so as to form the central illumination pattern.

In another aspect of the invention, each of the light emitting elements of the light source unit may include an LED for emitting light and an optical system for projecting a light emitting surface configuration of the LED so as to project forward an illumination pattern which is similar to the light emitting surface configuration.

By providing a high beam light distribution pattern with at least two illumination patterns which illuminate areas which are different from each other and a control unit for controlling the illumination patterns to be selectively turned on and off, an optimum high beam illumination area can be set according to the presence of, for example, a pedestrian, a preceding vehicle and/or an oncoming vehicle which is being driven ahead of the subject vehicle. Namely, in the event that an illumination pattern which has a side of a road as its illumination area is turned on, the driver can clearly recognize a pedestrian on the curb side of the road to thereby increase the visibility of the pedestrian. On the other hand, when the light distribution pattern which has a side of a road as its illumination area is turned off, a glare that dazzles the pedestrian can be reduced. In this way, a glare that dazzles a pedestrian and drivers of preceding and oncoming vehicles can be reduced, the visibility of a pedestrian can be increased, and an optimum high beam illumination state according to a driving condition can be realized.

By providing a vehicle lighting device that includes a detector for detecting an object which lies in front of the subject vehicle and a control unit for controlling the illumination patterns to be selectively turned on and off according to a detection result of the detector, the control unit can automatically select an optimum high beam light distribution pattern according to the result of detection of conditions ahead of the subject vehicle. The automatic selection allows for the best illumination state to be set without forcing the driver to perform a complex selecting operation, thereby making it possible to increase the safety and comfortableness in driving the vehicle.

By providing a vehicle lighting device that includes illumination patterns that include a leftward illumination pattern and a rightward illumination pattern and a control unit that controls the leftward illumination pattern and the rightward illumination pattern to be selectively turned on and off according to a detection result of the detector, a glare that dazzles a pedestrian and the driver of an oncoming vehicle can be reduced, and the visibility of a pedestrian by the driver of the subject vehicle is enhanced.

By providing a vehicle lighting device that includes a detector that detects an oncoming vehicle which is situated obliquely forward of the subject vehicle and a control unit that turns off either of the leftward illumination pattern and the rightward illumination pattern, a glare that dazzles the driver of an oncoming vehicle is reduced.

By providing a light source unit that includes a primary light emitting element for emitting light which is projected toward the left of the vehicle so as to form the leftward illumination pattern and a secondary light emitting element for emitting light which is projected toward the right of the vehicle so as to form the rightward illumination pattern and by enabling easy control of the primary light emitting element and the secondary light emitting element to be turned on and off, the leftward illumination pattern and the rightward illumination pattern can be formed by a simple device configuration.

By providing a light source unit that includes a primary reflecting element for reflecting light emitted from the primary light emitting element so as to be projected toward the left of the vehicle so as to form the leftward illumination pattern and a secondary reflecting element for reflecting light emitted from the secondary light emitting element so as to be projected toward the right of the vehicle so as to form the rightward illumination pattern, lights emitted from the primary light emitting element and the secondary light emitting element can be formed into an optimum leftward illumination pattern and an optimum rightward illumination pattern, respectively.

By providing illumination patterns that include a leftward illumination pattern, a rightward illumination pattern, and a central illumination, and a control unit that controls the leftward illumination pattern, the rightward illumination pattern, and the central illumination pattern to be selectively turned on and off, in addition to the reduction in glare that dazzles a pedestrian and the driver of an oncoming vehicle, a glare that dazzles the driver of a preceding vehicle can also be reduced.

By providing a configuration in which the illumination patterns include the leftward illumination pattern, the rightward illumination pattern, and the central illumination, in the event that the detector detects an oncoming vehicle which is situated obliquely forward of the subject vehicle as the object, the control unit can turn off either of the leftward illumination pattern and the rightward illumination pattern to reduce glare that could dazzle the driver of an oncoming vehicle.

By providing a control unit that turns off the central illumination pattern in the event that the detector detects a preceding vehicle which is situated directly ahead of the subject vehicle, a glare that is given by a high beam to be reflected on an inside rearview mirror in the preceding vehicle can be reduced.

By providing a light source unit that includes a primary light emitting element for emitting light which forms the leftward illumination pattern, a secondary light emitting element for emitting light which forms the rightward illumination pattern, and a tertiary light emitting element for emitting light which forms the central illumination pattern, by enabling easy control of the primary light emitting element, the secondary light emitting element and the tertiary light emitting element to be turned on and off, the leftward illumination pattern, the rightward illumination pattern and the central illumination pattern can be formed by a simple device configuration.

By providing a light source unit that includes a primary reflecting element for reflecting light emitted from the primary light emitting element so as to be projected to form the leftward illumination pattern, a secondary reflecting element for reflecting light emitted from the secondary light emitting element so as to be projected to form the rightward illumination pattern, and a tertiary reflecting element for reflecting light emitted from the tertiary light emitting element so as to be projected to form the central illumination pattern, lights emitted from the primary light emitting element, the secondary light emitting element and the tertiary light emitting element can be formed into an optimum leftward illumination pattern, an optimum rightward illumination pattern, and an optimum central illumination pattern, respectively.

By providing a configuration in which each of the light emitting elements of the light source unit includes the LED for emitting light and the optical system for projecting the light emitting surface configuration of the LED so as to project forward the illumination pattern which is similar to the light emitting surface configuration, the LED, which makes up the light source, is strong enough to bear the repetition of being turned on and off and hence can be used over a long period of time. In addition, since no wide space is necessary for setting the light source unit due to the usage of the LED, the whole of the vehicle lighting device can be made small in size. Additionally, by projecting the light emitting surface configuration of the LED using the optical system so as to project forward the illumination pattern which is similar to the light emitting surface configuration, a light distribution pattern in a specific configuration can easily be obtained with a simple configuration.

BRIEF DESCRIPTION OF THE DRAWINGS

FIGS. 4(a)-4(c) show explanatory diagrams of another modified example in which a parabolic reflector is used, in which FIG. 4(a) is a vertical sectional view, and FIGS. 4(b) and (c) are front views of the reflector.

FIGS. 5(a) and 5(b) show enlarged perspective views of a main part of a parabolic reflector, in which FIG. 5(a) shows a construction in which an LED is arranged horizontally on the parabolic reflector, and FIG. 5(b) shows a construction in which the LED is arranged vertically on the reflector.

DETAILED DESCRIPTION OF PREFERRED EMBODIMENTS OF THE INVENTION

Figure 1:
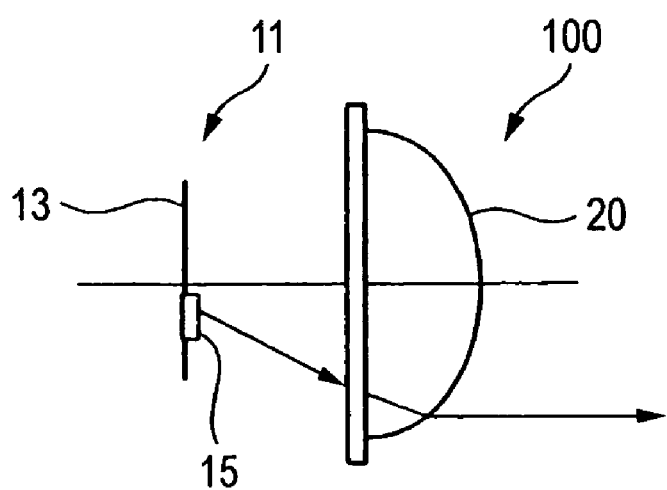
FIGS. 1(a) and 1(b) show explanatory diagrams which explain the concept of a vehicle lighting device according to an embodiment of the invention.
Figure 1:
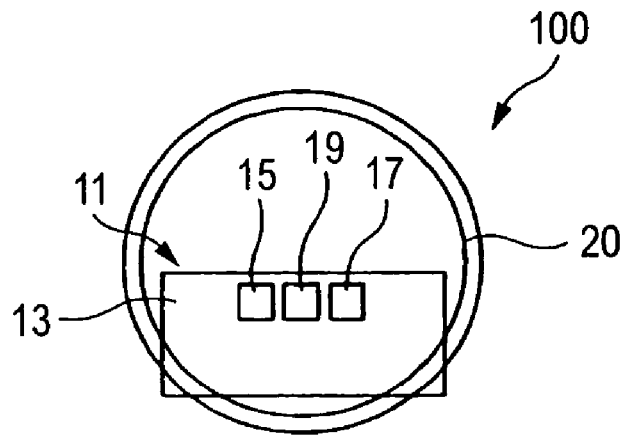

Hereinafter, preferred embodiments of a vehicle lighting device according to the invention will be described with reference to the accompanying drawings.

In FIGS. 1(a) and 1(b), a lighting device in accordance with a preferred embodiment of the present invention is shown. In this embodiment, vehicle lighting device 100 includes a light source unit 11 which emits light and projects forward light from the light source unit 11 to form a high beam light distribution pattern P(H). The high beam light distribution pattern P(H) has at least two illumination patterns which illuminate areas which are different from each other. In this embodiment, an example will be described in which the high beam light distribution pattern has three illumination patterns PL, PC, PR.

A control unit, which will be described in greater detail below, is connected to the light source unit 11, and the control unit can control individually the illumination patterns PL, PC, PR so as to be turned on and off selectively. In this embodiment, the illumination patterns PL, PC, PR include a leftward illumination pattern PL projected toward a left front of the vehicle lighting device, a rightward illumination pattern PR projected toward a right front of the vehicle lighting device and a central illumination pattern PC which is projected between the leftward illumination pattern and the rightward illumination pattern. Consequently, as is shown in FIGS. 2(a)-2(c), the control unit can control the leftward illumination pattern PL, the rightward illumination pattern PR and the central illumination pattern PC so as to be turned on and off selectively. Note that in the figures, P(L) denotes a low beam light distribution pattern.

As is shown in FIGS. 1(a) and 1(b), the light source unit 11 has a vertical base table 13, and three LEDs. The three LEDs include a primary LED (a primary light emitting element) 15 which emits light toward the left of the vehicle so as to form the leftward illumination pattern PL, a secondary LED (a secondary light emitting element) 17 which emits light toward the right of the vehicle so as to form the rightward illumination pattern PR and a tertiary LED (a tertiary light emitting element) 19 which emits light which is projected between the leftward illumination pattern PL and the rightward illumination pattern PR so as to form the central illumination pattern PC, all provided on one side of the vertical base table 13. By having the primary LED 15, secondary LED 17 and tertiary LED 19 which make up the primary light emitting element, second light emitting element and tertiary light emitting element, respectively, the light source unit 11 enables the formation of the leftward illumination pattern PL, rightward illumination pattern PR and central illumination pattern PC with a simple device configuration through an easy turning on and off control. Note that reference numeral 20 in FIGS. 1(a) and 1(b) denotes a projection lens.

In this embodiment, light emitting surface configurations of the primary, secondary, and tertiary LEDs 15, 17, 19 of the light source unit 11 are projected forward by the projection lens 20, so that light distribution patterns which are similar to the light emitting surface configurations of the LEDs 15, 17, 19 are projected forward. In general, since an LED as a light source is strong enough to bear the repetition of being turned on and off, the usage of the LED for the light source is preferable because the LED can bear the usage over a long period of time. In addition, since the necessity of a wide setting space for the light source unit is obviated by the usage of the LED, the whole of the vehicle lighting device can be made small in size. Additionally, by projecting the light emitting surface configuration of the LEDs 15, 17, 19 utilizing the projection lens 20 so as to project forward the light distribution patterns which are similar to the light emitting surface configurations, a light distribution in a specific configuration can easily be obtained with a correspondingly simple configuration.

Figure 3:
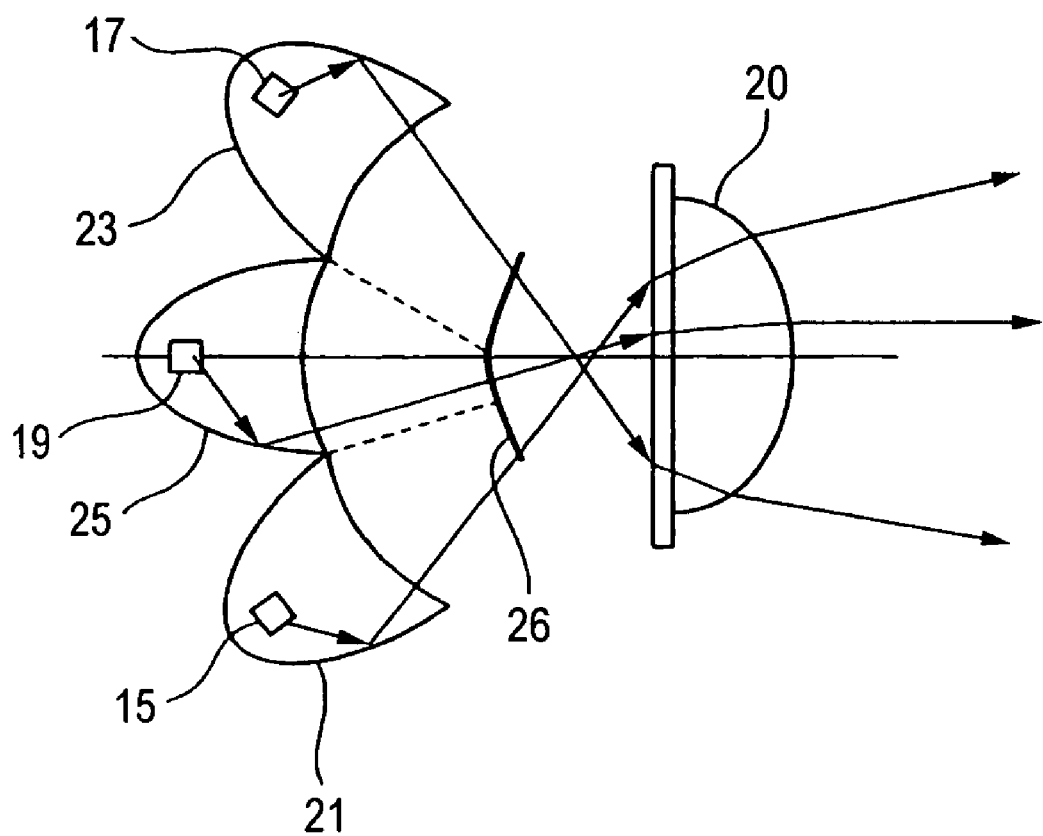
FIG. 3 is a plan view showing a modified example which includes reflecting elements in addition to the basic configuration of the light source unit shown in FIGS. 1(a) and (b).

FIG. 3 is a plan view showing a modified example which includes reflecting elements in addition to the basic configuration of the light source unit shown in FIGS. 1(*a*) and 1(*b*). A light source unit 11 may include a primary reflecting element 21 which projects light emitted from a primary LED 15 toward the left of the vehicle so as to form a leftward illumination pattern PL, a secondary reflecting element 23 which projects light emitted from a secondary LED 17 toward the right of the vehicle so as to form a rightward illumination pattern PR, and a tertiary reflecting element 25 which projects light emitted from the tertiary LED 19 so as to form a central illumination pattern PC. Note that in FIG. 3, reference numeral 26 denotes a shade for forming a cut-off line. However, since this embodiment is such as to form a high beam pattern, the shade 26 is basically unnecessary. For example, in the event that the shade 26 is a movable shade which can move in a vertical direction and that a high beam and a low beam are selectively formed from the light source unit 11, this shade 26 may be made to move.

By adopting this configuration, lights emitted from the primary LED 15, the secondary LED 17, and the tertiary LED 19 can be formed into an optimum leftward illumination pattern PL, an optimum rightward illumination pattern PR, and an optimum central illumination pattern PC, respectively.

Figure 4:
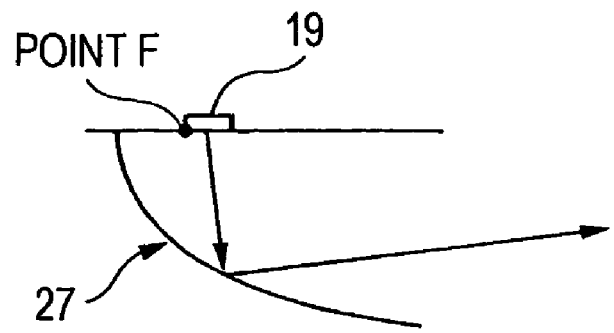
Figure 4:
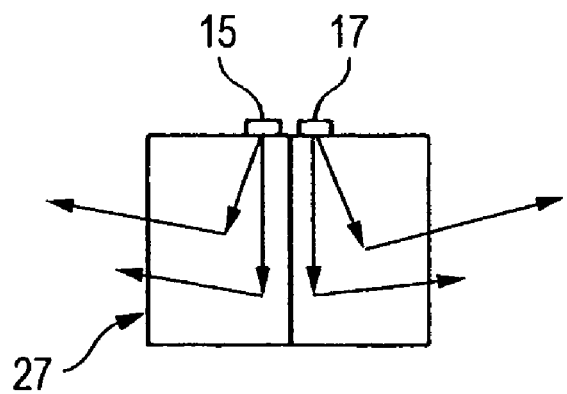
Figure 4:
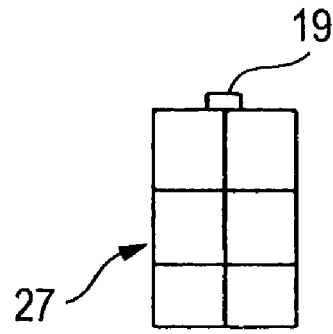
Figure 5:
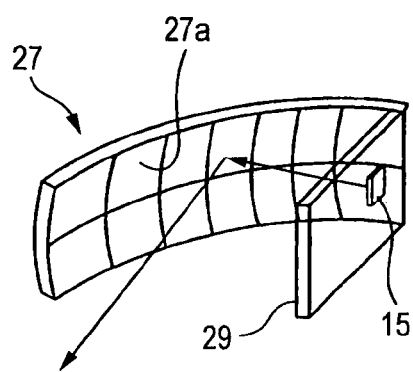
Figure 5:
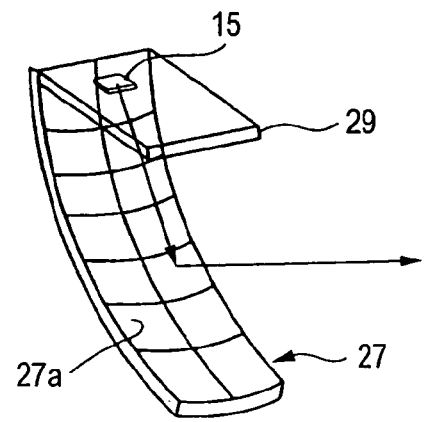

FIG. 4 shows another modified example in which a parabolic reflector is used, in which FIG. 4(*a*) is an explanatory diagram showing a vertical sectional view, and FIG. 4(*b*) and FIG. 4(*c*) are explanatory diagrams showing front views of the reflector. FIGS. 5(*a*) and 5(*b*) show enlarged perspective views of a main part of the parabolic reflector, in which FIG. 5(*a*) shows a configuration in which an LED is arranged horizontally on the parabolic reflector, and FIG. 5(*b*) shows a configuration in which the LED is arranged vertically on the reflector.

As is shown in FIG. 3, a plurality of reflecting elements (reflectors) 21, 23, 25 are provided for the primary LED 15, the secondary LED 17, and the tertiary LED 19, respectively. In the embodiment shown in FIG. 4, the plurality of reflecting elements are formed into a parabolic reflector 27, whereby, as with what has been described above, lights emitted from the plurality of LEDs can be formed into a leftward illumination pattern PL, a rightward illumination pattern PR, and a central illumination pattern PC, respectively, by the reflecting elements each having a single configuration. In this case, the primary 15, the secondary LED 17, and the tertiary LED 19 are disposed at respective focal points F of the parabolic reflectors 27, respectively.

The configuration shown in FIGS. 4(*a*)-4(*c*) allows for the construction of the reflecting element to be made small and simple by reducing the number of components involved, thereby making it possible to reduce the device costs. In this case, as a mounting construction of the LEDs, the LED (for example, the primary LED 15) may be disposed vertically on a base 29 which is disposed vertically to face a reflecting surface 27*a* of the parabolic reflector 27, as is shown in FIG. 5(*a*). Alternatively, as is shown in FIG. 5(*b*), the LED 15 may be disposed horizontally on the base 29 which is disposed horizontally to face the reflecting surface 27*a* of the parabolic reflector 27. With the LED disposed horizontally, the overall height of the light source unit 11 can be suppressed to a low height, whereas with the LED disposed vertically, a dimension of the light source unit 11 in a transverse direction of the vehicle can be narrowed.

Figure 6:
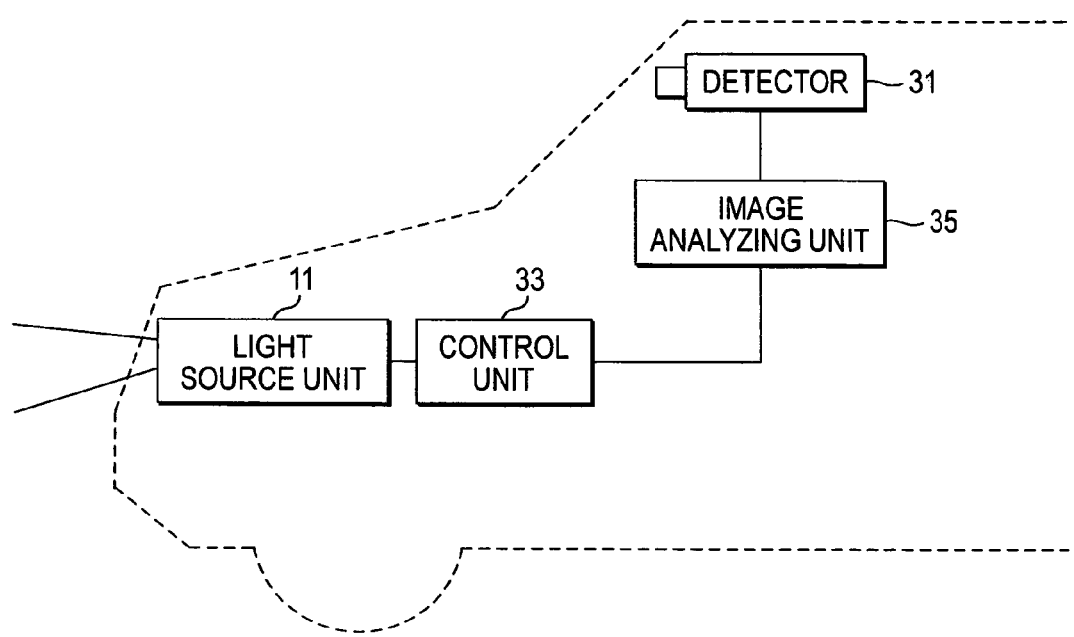
FIG. 6 is a block diagram showing a schematic configuration of a control system.

FIG. 6 is a block diagram showing a schematic configuration of a control system. The vehicle lighting device 100 according to the embodiment shown in FIG. 6 includes a detector 31 for detecting an object which is situated ahead of the subject vehicle. The aforesaid control unit 33 can control two or more illumination patterns to be selectively turned on and off according to a detection result of the detector 31. In addition to this, the control system may have an image analyzing unit 35. For example, a CCD camera is used for the detector 31 and is set so as to photograph an image in a forward area toward which the vehicle is traveling. In addition to this CCD camera, other means may be used as the detector 31. For example, a radar may be used which utilizes an electromagnetic wave of one of various types to specify the position of a vehicle or a pedestrian, or communications equipment may be provided on individual vehicles to implement an inter-vehicle communication to thereby specify the positions of the vehicles.

An embodiment in which an image is photographed will now be described. In this particular embodiment, an image ahead of the subject vehicle is photographed by the detector 31 and converted to an image signal to be inputted into the image analyzing unit 35. The image analyzing unit 35 analyzes the image signal transmitted thereto from the detector 31 and calculates the position of another vehicle existing ahead of the subject vehicle based on a distance and an angle relative to the vehicle. The control unit 33 receives an output signal from the image analyzing unit 35 to generate a control signal which controls the light source unit 11 from a distance value and an angle value which have been calculated by the image analyzing unit 35. The control signal generated by the control unit 33 is sent to the light source unit 11. Specifically, the control unit 33 calculates quantities of voltage to be applied to the light source unit 11 to form a high beam and a low beam and supplies voltages so calculated to the primary LED 15, the secondary LED 17, and the tertiary reflecting element 25.

According to the control system including the detector 31 as described above, since the control unit 33 controls the illumination patterns to be turned on and off selectively according to the detection result of the detector 31, the control unit 33 can select an optimum high beam light distribution pattern automatically according to the result of a detection of conditions ahead of the subject vehicle, so as to enable the setting of an optimum illumination state without forcing the driver to perform a complex selecting operation, thereby making it possible to increase the safety and comfortableness in driving the vehicle.

Figure 7:
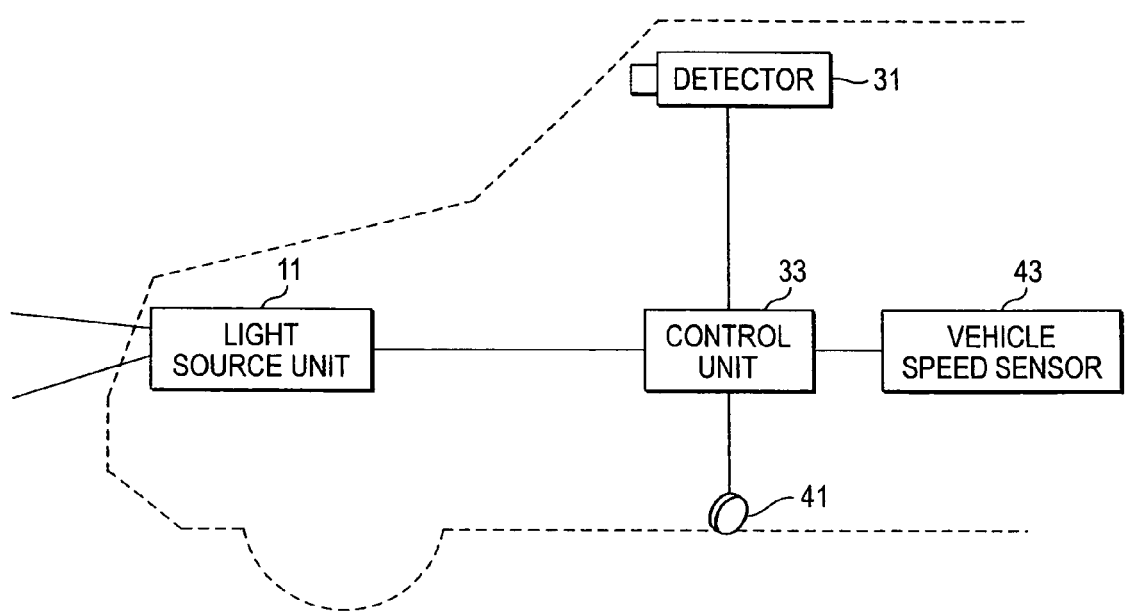
FIG. 7 is a block diagram showing another example of a control system.

FIG. 7 is a block diagram showing another example of a control system. This control system may include a radar 41 and a detector 31 which detect an obstacle lying ahead of the subject vehicle and a vehicle speed sensor 43 for detecting a vehicle speed. The illumination patterns are controlled by the control unit 33 so as to be turned on and off selectively according to the presence of an obstacle detected by the detector 31 and the like and a vehicle speed detected by the vehicle speed sensor.

Figure 8:
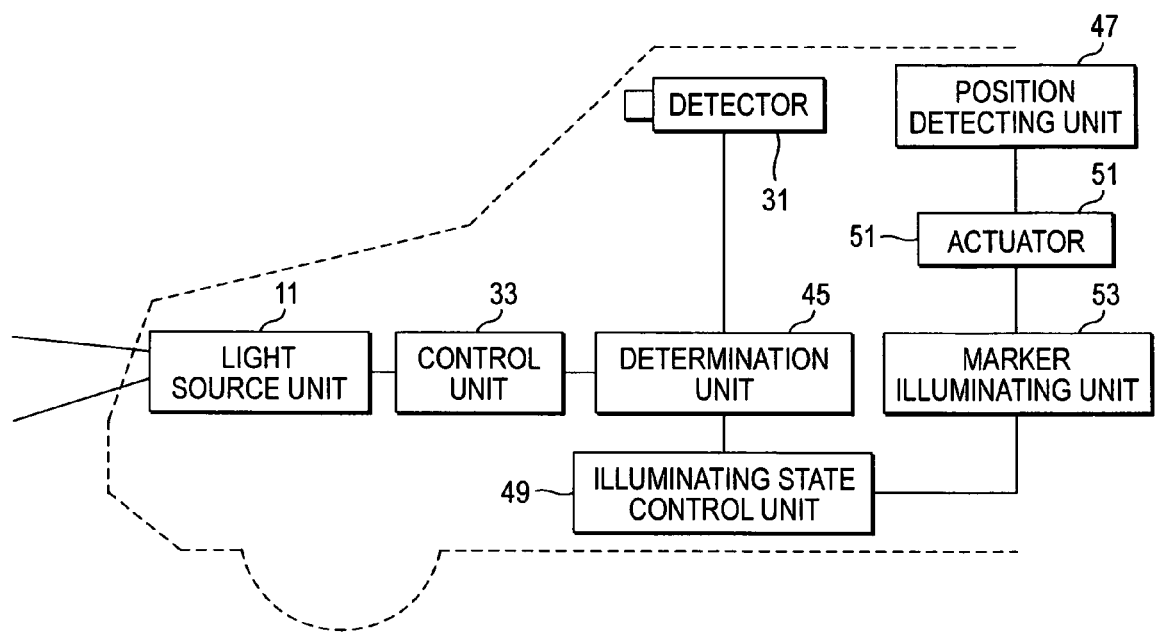
FIG. 8 is a block diagram showing a further example of a control system.

FIG. 8 is a block diagram showing a further example of a control system. This control system may include a control unit 33 and an IR camera, which is a detector 31, a determination unit 45, a position detecting unit 47, an illuminating state control unit 49, an actuator 51, and a marker illuminating unit 53. The detector 31 photographs the front of the subject vehicle to detect an object such as a pedestrian. The determination unit 45 calculates a degree of certainty to which the object so detected is determined to be a pedestrian based on the value of brightness of an image photographed by the detector 31, a geometric shape of the object and the presence of a movement of the object. In the event that the degree of certainty determined by the determination unit 45 is low, the illuminating state control unit 49 extends a time during which the marker illuminating unit 53 illuminates the object with an increased amount of light. In the control system configured as described above, the degree of certainty to which the object detected by the detector 31 is determined to be a pedestrian is calculated. The methods of illuminating the object are changed based on the degree of certainty so calculated, whereby the guiding of the line of sight of the driver to the object, which is not a pedestrian, due to the object being illuminated can be mitigated.

Figure 9:
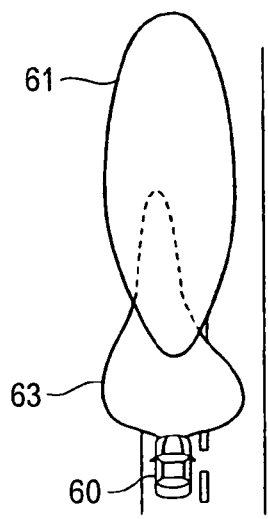
FIGS. 9(a) and 9(b) are explanatory diagrams respectively showing in an illumination range on the surface of a road when the subject vehicle is being driven alone thereon and a light distribution pattern resulting therefrom.
Figure 9:
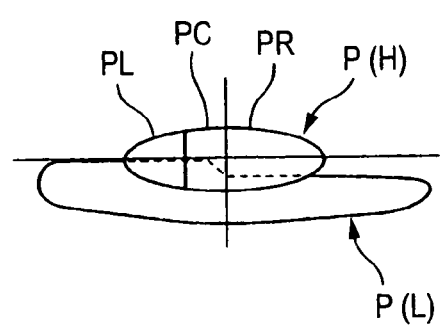

Turning to FIGS. 9(a) and 9(b), when a vehicle 60 is being driven along with no pedestrian, preceding vehicle and oncoming vehicle detected by the detector 31, the primary LED 15, the secondary LED 17 and the tertiary LED 19 of each of the vehicle lighting devices 100 mounted on the vehicle 60 are turned on by the control unit 33 so as to form a high beam light distribution pattern P(H) shown in FIG. 9(b) over an illumination range 61 on the road surface shown in FIG. 9(a). Note that in FIG. 9(a) reference numeral 63 denotes an illumination range on the road surface where a low beam light distribution pattern is projected. By adopting this configuration, the high beam light distribution pattern P(H) having a good visibility in a far field area which is similar to a conventional one can be obtained.

Figure 10:
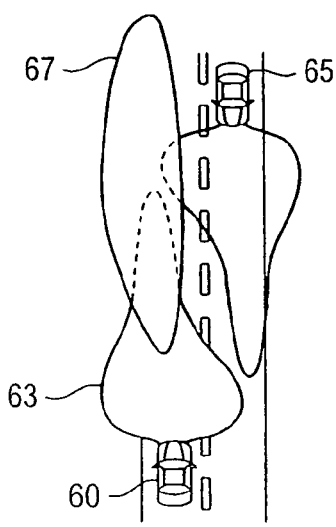
FIGS. 10(a) and 10(b) are explanatory diagrams respectively showing an illumination range on the road surface when there is an oncoming vehicle and in a light distribution pattern resulting therefrom.
Figure 10:
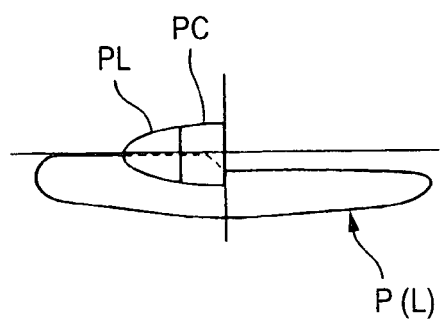

When an oncoming vehicle 65 is detected by the detector 31, the control unit 33 turns off the secondary LED 17 while turning on the primary LED 15 and the tertiary LED 19 of each automotive lamp 100, whereby a leftward illumination pattern PL and a central illumination pattern PC shown in FIG. 10(b) are formed over an illumination range 67 on the road surface shown in FIG. 10(a). Thus, since the illumination patterns include the leftward illumination pattern PL, a rightward illumination pattern PR and the central illumination pattern PC, and the control unit 33 controls these illumination patterns to be turned on and off selectively, the visibility in the far field area can be increased while reducing a glare that dazzles the driver of the oncoming vehicle 65.

Figure 11:
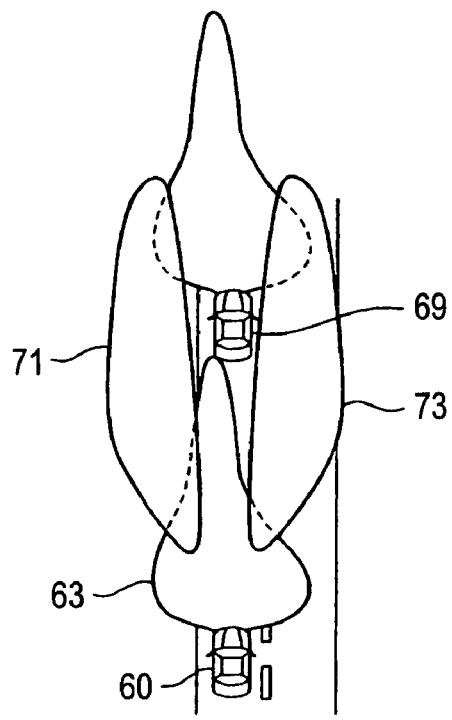
FIGS. 11(a) and 11(b) are explanatory diagrams respectively showing an illumination range on the road surface when there is a preceding vehicle and a light distribution pattern resulting therefrom.
Figure 11:
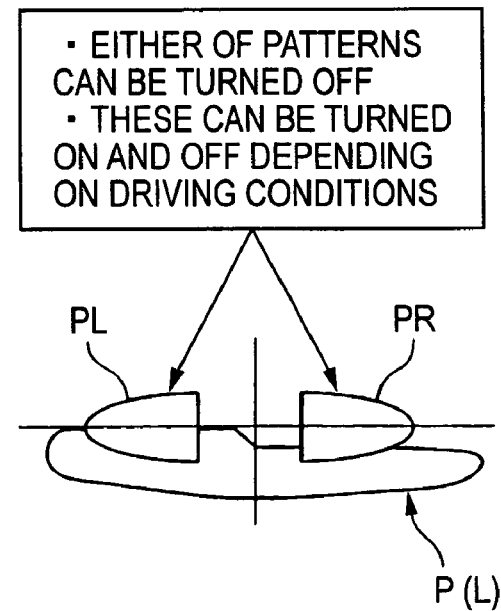

As is shown in FIGS. 11(a) and 11(b), the detector 31 detects a preceding vehicle 69, and the control unit 33 controls the LEDs of each automotive lamp 100 such that the tertiary LED 19 is turned off and the primary LED 15 and the secondary LED 17 are turned on, whereby the leftward illumination pattern PL and the rightward illumination pattern PR shown in FIG. 11(b) are formed over illumination ranges 71 and 73 on the road surface shown in FIG. 11(a), respectively. Thus, in the event that the detector 31 detects the preceding vehicle 69 lying right ahead of the subject vehicle as an object, since the control unit 33 turns off the central illumination pattern PC, a glare imparted by the high beams and reflected on an inside rearview mirror in the preceding vehicle 69 can be reduced. In addition, in this light distribution pattern, either of the left and right high beams may be turned off.

Figure 12:
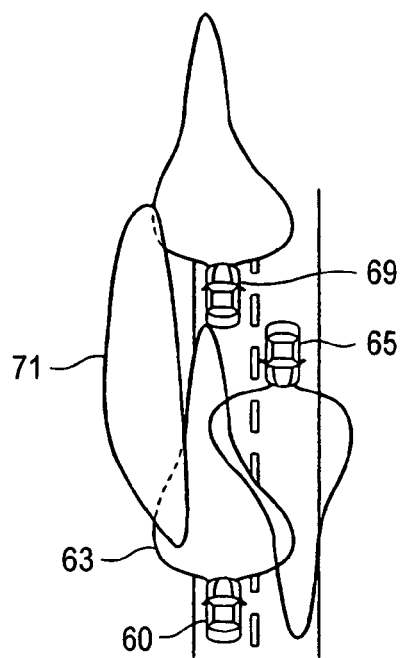
FIGS. 12(a) and 12(b) are explanatory diagrams respectively showing an illumination range on the road surface when there is a preceding vehicle and an oncoming vehicle and a light distribution pattern resulting therefrom.
Figure 12:
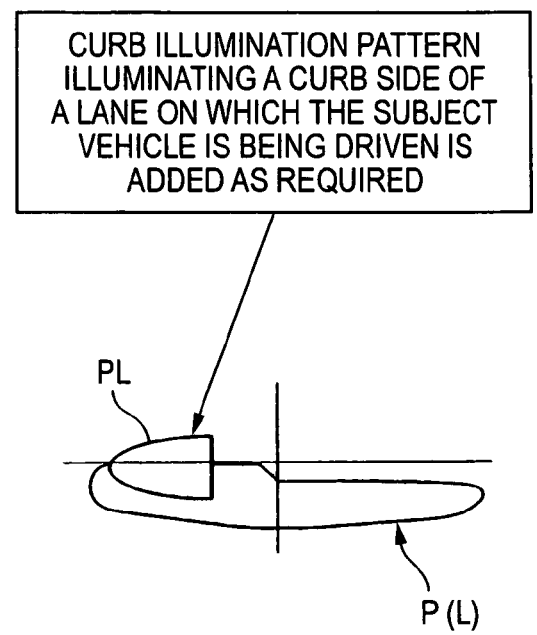

As is shown in FIGS. 12(a) and 12(b), the detector 31 detects a preceding vehicle 69 and an oncoming vehicle 65. In response, the control unit 33 controls the LEDs of each automotive lamp 100 such that the secondary LED 17 and the tertiary LED 19 are turned off and only the primary LED 15 is turned on, whereby the leftward illumination pattern PL shown in FIG. 12(b) is formed over an illumination range 71 on the road surface shown in FIG. 12(a). Thus, since the illumination patterns include the leftward illumination pattern PL, the rightward illumination pattern PR and the central illumination pattern PC, and the control unit 33 controls these illumination patterns to be turned on and off selectively so that only the leftward illumination pattern PL is turned on, glares that dazzle the preceding vehicle 69 and the oncoming vehicle 65 can be reduced and the visibility of a pedestrian can be increased.

Because the high beam light distribution pattern P(H) has at least two illumination patterns which illuminate areas which are different from each other and the control unit 33 is provided which controls these illumination patterns to be turned on and off selectively, the illumination area of the high beam can be set to an optimum level according to the presence of the pedestrian, the preceding vehicle 69, and/or the oncoming vehicle 65. Namely, in the event that the leftward illumination pattern PL which illuminates a curb side of the road is turned on, the driver can clearly recognize a pedestrian. In contrast, if the leftward illumination pattern PL which illuminates the curb side of the road is controlled to be turned off, a glare that dazzles the pedestrian can be reduced. In this way, the glares that dazzle the pedestrian; the preceding vehicle 69 and the oncoming vehicle 65 can be reduced, the visibility of the pedestrian can be increased, and the optimum high beam illumination states according to the driving conditions of the subject vehicle can be realized.

Note that embodiments of the present invention are not limited to the illumination patterns that are made up of three divided patterns such as the leftward illumination pattern PL, the rightward illumination pattern PR, and the central illumination pattern PC. In other embodiments, the illumination patterns may be made up of a plurality of divided patterns other than the three divided patterns, such as two divided patterns of only the leftward illumination pattern PL and the rightward illumination pattern PR, for example. In this case, a boundary between the divided patterns becomes the center of the central illumination pattern PC. According to the vehicle lighting device in which the illumination patterns are made up of the two divided patterns, the control unit 33 controls the leftward illumination pattern PL and the rightward illumination pattern PR to be turned on and off selectively, whereby glares that dazzle a pedestrian and an oncoming vehicle 65 can be reduced, and the visibility of a pedestrian can be increased.

In addition, in the vehicle lighting device in which the illumination patterns are made up of the two divided patterns, when the detector 31 detects an oncoming vehicle 65 as an object, either of the leftward illumination pattern PL and the rightward illumination pattern PR is made to be turned off, whereby a glare that dazzles the oncoming vehicle 65 can be reduced.

In addition, in the vehicle lighting device in which the illumination patterns are made up of the two divided patterns, the vehicle lighting device is configured to include a primary LED 15 for emitting light which is projected toward the left of the subject vehicle to form the leftward illumination pattern PL and a secondary LED 17 for emitting light which is projected toward the right of the subject vehicle to form the rightward illumination pattern PR, whereby by controlling the primary LED 15 and the secondary LED 17 to be turned on and off in an easy fashion, the leftward illumination pattern PL and the rightward illumination pattern PR can be formed with a simple device configuration.

Furthermore, in the vehicle lighting device in which the illumination patterns are made up of the two divided patterns, a primary reflecting element 21 for reflecting light emitted from the primary LED 15 so as to be projected toward the left of the subject vehicle to form the leftward illumination pattern PL and a secondary reflecting element for reflecting light emitted from the secondary LED 17 so as to be projected toward the right of the subject vehicle to form the rightward illumination pattern PR are preferably provided, whereby lights emitted from the primary LED 15 and the secondary LED 17 can be formed into an optimum leftward illumination pattern PL and an optimum rightward illumination pattern PR, respectively.

While in the embodiment above the plurality of LEDs are controlled to be turned on and off selectively, the vehicle lighting device according to the invention may be configured such that, for example, a single light source is provided, and light emitted from this light source is projected simultaneously toward a plurality of desired illumination areas by a direction changing unit. In this case, the direction changing unit may have a number of reflecting devices, and the reflecting devices may be disposed on, for example, a single common support element. The reflecting devices are made to move between at least two predetermined positions independently of one another and relative to the support element. Each of the reflecting devices can be moved between the at least two positions by, for example, an electromagnetic adjustment control device. The direction changing element may be made up as a so-called DMD (Digital Mirror Device).

The reflecting device can be made to move to the predetermined positions by virtue of an electromagnetic force which acts between the adjustment control device and the reflecting device depending on whether or not a voltage is applied to an electromagnetic device. According to the vehicle lighting device provided with the direction changing unit that is configured as described above, light from the light source is reflected to the reflecting devices, whereby a high beam distribution pattern P(H) can be obtained in which a light distribution pattern is divided into a desired number of divisions and a desired configuration.

Figure 13:
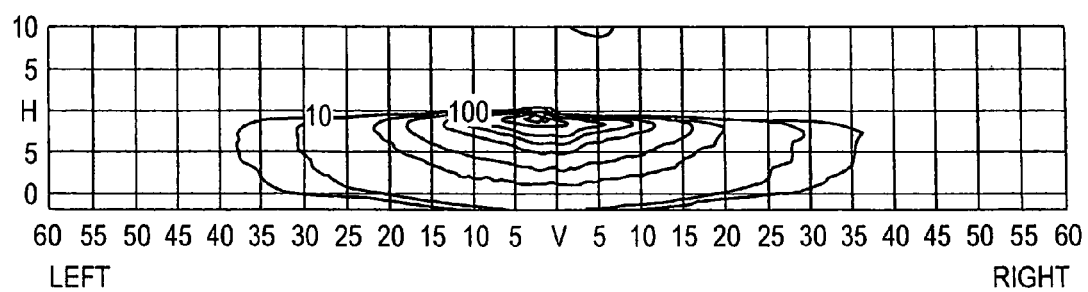
FIG. 13 is an equiluminous curve diagram of a low beam.
Figure 14:
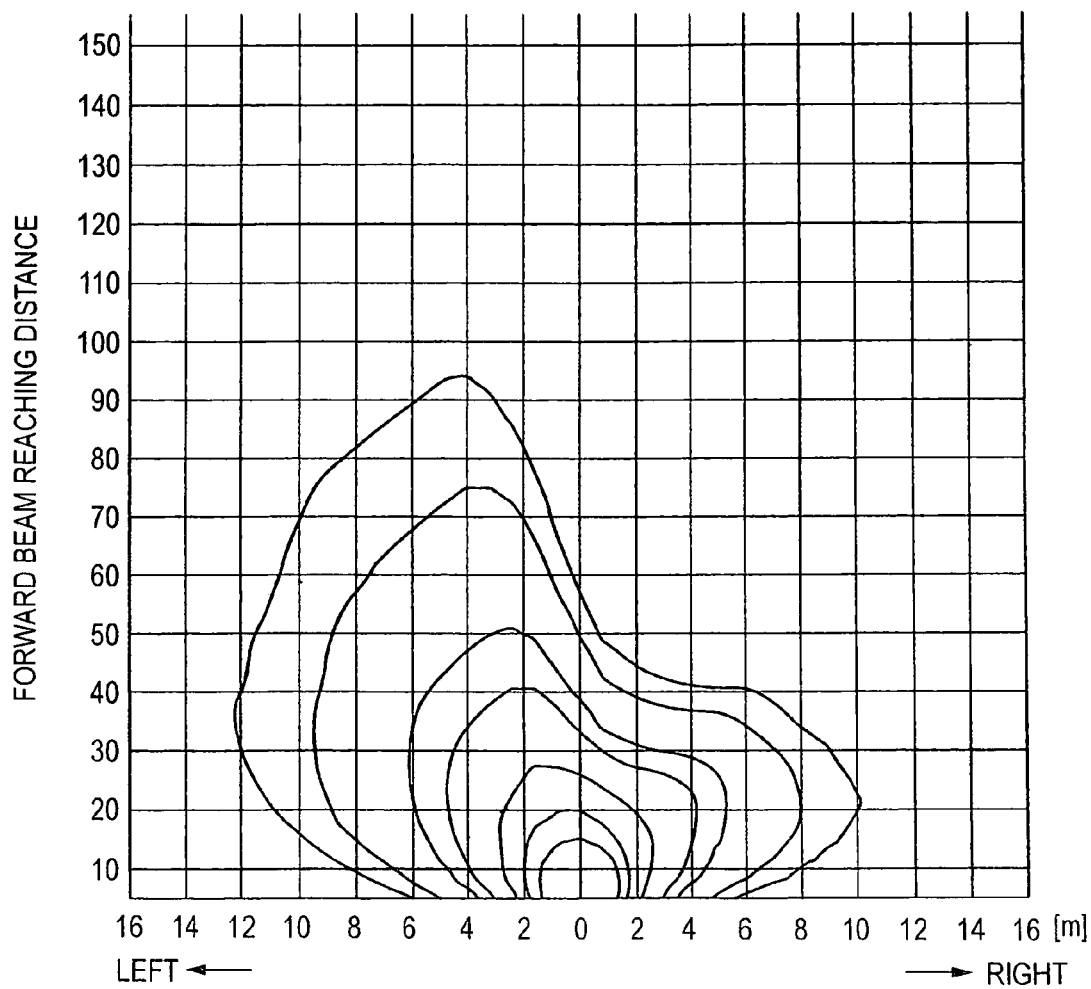
FIG. 14 is a road surface illumination intensity distribution diagram.

When a low beam is projected, as is shown in FIG. 13, a cut-off line is suppressed in the vicinity of a vertical scale H and the beams are not projected thereabove. In addition, as to a forward beam reaching distance, an area 90 m ahead of the subject vehicle on a left-hand side of an optical axis is illuminated by the low beam, as is shown in FIG. 14.

Figure 2:
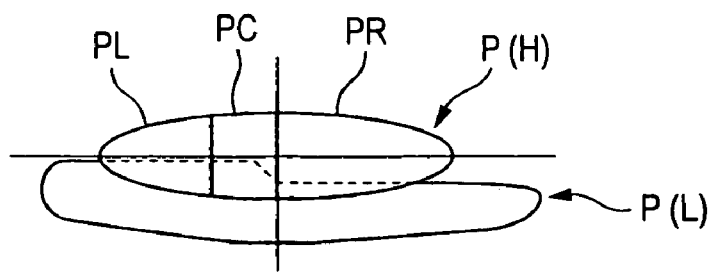
FIGS. 2(a)-2(c) show explanatory diagrams which show light distribution patterns that are formed by the vehicle lighting device shown in FIGS. 1(a) and (b).
Figure 2:
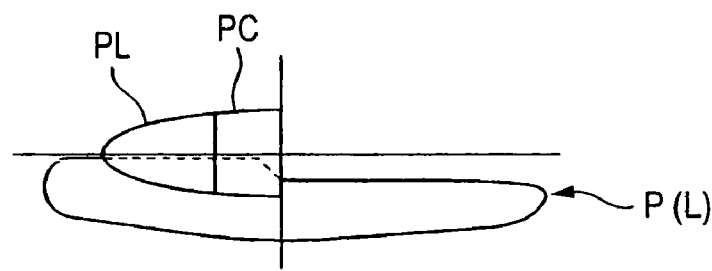
Figure 2:
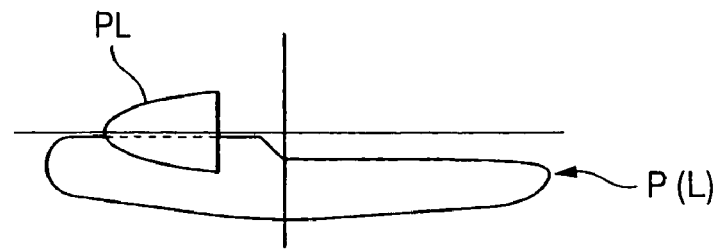
Figure 15:
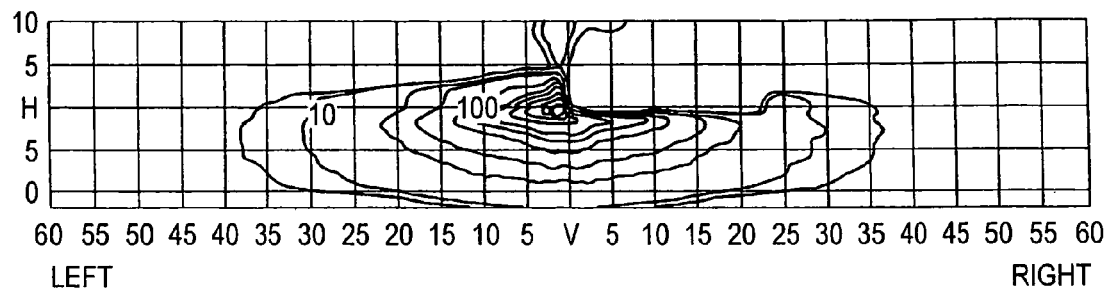
FIG. 15 is an equiluminous curve diagram resulting when a lane of a road on which the subject vehicle is being driven is illuminated with a high beam.
Figure 16:
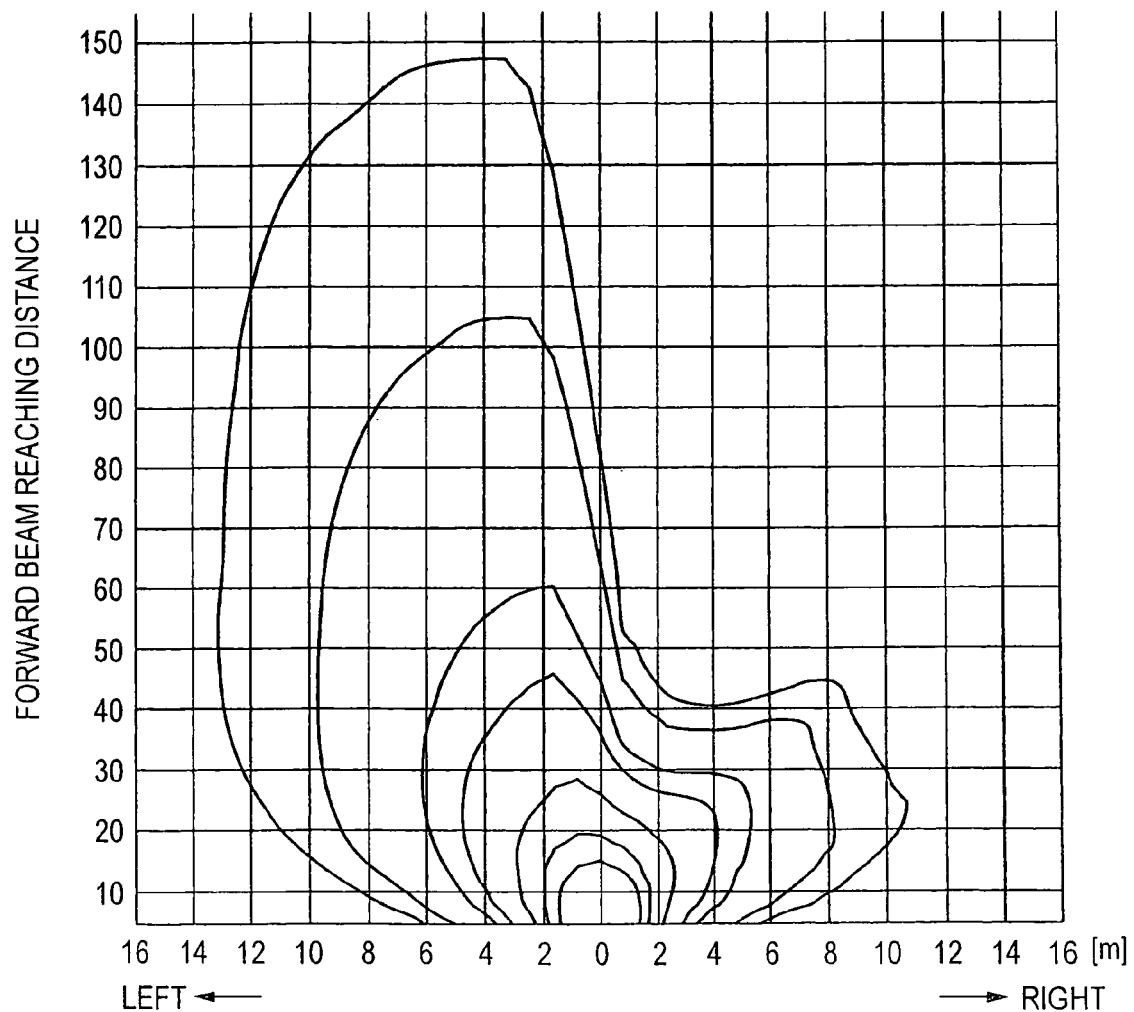
FIG. 16 is a road surface illumination intensity distribution diagram resulting when the lane on which the subject vehicle is being driving is illuminated with the high beam.

As is shown in FIG. 15, when the high beam is projected to illuminate only the lane of the road on which the subject vehicle is being driven (e.g., the light distribution pattern shown in FIG. 2(*b*)), the area illuminated by the vehicle lighting device 100 is expanded upward over the cut-off line from the vertical scale H to a height equal to a vertical scale of 5. The expanded illumination area toward the left increases steeply along the optical axis as a boundary. In addition, in terms of road surface illumination intensity distribution, as is shown in FIG. 16, it was recognized that the illumination area was expanded as far forward as 150 m ahead of the subject vehicle.

Thus, the illumination area is expanded more when the high beam is selectively turned on rather than when only the low beam is projected so as to increase the visibility in the far field area. In addition, even when the high beam is selectively turned on, by selectively cutting off light that illuminates a predetermined illumination area, glares that dazzle an oncoming vehicle, a preceding vehicle and the like can be eliminated while increasing the visibility in the far field area.

Although the invention has been described above with respect to preferred embodiments, those skilled in the art, having benefit of this disclosure, will appreciate that other embodiments can be devised which do not depart from the spirit and scope of the invention as disclosed and claimed herein, and such modifications are intended to fall within the scope of the appended claims.

What is claimed is:

1. A vehicle lighting device comprising:
    at least two light source units for emitting light, whereby light emitted from the light source units is made to travel forward to form a high beam light distribution pattern; and
    a detector for detecting an object which lies in front of the subject vehicle,
    wherein the high beam light distribution pattern has at least two illumination patterns which illuminate areas which are different from each other,
    wherein one of the at least two illumination patterns is illuminated by one of the at least two light source units and another of the at least two illumination patterns is illuminated by another of the at least two light source units,
    wherein a control unit is provided for controlling the at least two illumination patterns to be selectively turned on and off by selectively turning on and off at least one of the at least two light source units,
    wherein the control unit controls the at least two illumination patterns to be selectively turned on and off according to a detection result of the detector.

2. The vehicle lighting device as set forth in claim 1, wherein the at least two illumination patterns include a leftward illumination pattern which is projected toward a left front of the vehicle lighting device and a rightward illumination pattern which is projected toward a right front of the vehicle lighting device, and
    wherein the control unit controls the leftward illumination pattern and the rightward illumination pattern to be selectively turned on and off according to a detection result of the detector.

3. The vehicle lighting device as set forth in claim 2, wherein in the event that the detector detects an oncoming vehicle which is situated obliquely forward of the subject vehicle as the object, the control unit turns off either of the leftward illumination pattern and the rightward illumination pattern.

4. A vehicle lighting device comprising:
    a light source unit for emitting light, whereby light emitted from the light source unit is made to travel forward to form a high beam light distribution pattern; and
    a detector for detecting an object which lies in front of the subject vehicle,
    wherein the high beam light distribution pattern has at least two illumination patterns which illuminate areas which are different from each other,
    wherein a control unit is provided for controlling the at least two illumination patterns to be selectively turned on and off,
    wherein the control unit controls the at least two illumination patterns to be selectively turned on and off according to a detection result of the detector,
    wherein the light source unit comprises a primary light emitting element for emitting light which is projected toward the left of the vehicle so as to form the leftward illumination pattern and a secondary light emitting element for emitting light which is projected toward the right of the vehicle so as to form the rightward illumination pattern.

5. A vehicle lighting device comprising:
a light source unit for emitting light, whereby light emitted from the light source unit is made to travel forward to form a high beam light distribution pattern; and
a detector for detecting an object which lies in front of the subject vehicle,
wherein the high beam light distribution pattern has at least two illumination patterns which illuminate areas which are different from each other,
wherein a control unit is provided for controlling the at least two illumination patterns to be selectively turned on and off,
wherein the control unit controls the at least two illumination patterns to be selectively turned on and off according to a detection result of the detector,
wherein the at least two illumination patterns comprise a leftward illumination pattern which is projected toward a left front of the vehicle lighting device, a rightward illumination pattern which is projected toward a right front of the vehicle lighting device, and a central illumination pattern which is projected between the leftward illumination pattern and the rightward illumination pattern, and wherein
the control unit controls the leftward illumination pattern, the rightward illumination pattern, and the central illumination pattern to be selectively turned on and off.

6. The vehicle lighting device as set forth in claim 5, wherein in the event that the detector detects an oncoming vehicle which is situated obliquely forward of the subject vehicle as the object, the control unit turns off either of the leftward illumination pattern and the rightward illumination pattern.

7. The vehicle lighting device as set forth in claim 5, wherein in the event that the detector detects a preceding vehicle which is situated directly ahead of the subject vehicle as the object, the control unit turns off the central illumination pattern.

8. The vehicle lighting device as set forth in claim 5, wherein the light source unit comprises a primary light emitting element for emitting light which is projected toward the left of the vehicle so as to font' the leftward illumination pattern, a secondary light emitting element for emitting light which is projected toward the right of the vehicle so as to form the rightward illumination pattern, and a tertiary light emitting element for emitting light which is projected between the leftward illumination pattern and the rightward illumination pattern so as to form the central illumination pattern.

9. The vehicle lighting device as set forth in claim 4, wherein each of the light emitting elements of the light source unit comprises an LED for emitting light and an optical system for projecting a light emitting surface configuration of the LED so as to project forward an illumination pattern corresponding to the light emitting surface configuration.

10. A control system for a vehicle, the control system comprising:
a vehicle lighting device configured to project light forward of the vehicle in a high beam light distribution pattern with at least two illumination patterns which illuminate areas which are different from each other;
a detector configured to detect an object forward of the vehicle; and
a control unit configured to selectively turn on and off at least one of the at least two illumination patterns in response to a detection result of said detector,
wherein one of the at least two illumination patterns is illuminated by one of at least two light source units and another of the at least two illumination patterns is illuminated by another of the at least two light source units,
wherein the control unit selectively turns on and off at least one of the at least two illumination patterns by selectively turning on and off at least one of the at least two light source units.

11. The control system of claim 10, further comprising:
an image analyzing unit configured to receive an image signal transmitted from the detector and calculate a position of the object detected by said detector, wherein said control unit receives an output signal indicative of the position of the object from said image analyzing unit.

12. The control system of claim 10, further comprising: a radar that detects an obstacle lying ahead of the vehicle; and a vehicle speed sensor that senses vehicle speed, wherein
said control unit is configured to selectively turn on and off the at least one of the at least two illumination patterns in response to an output of said radar and said vehicle speed sensor.

13. The control system of claim 10, wherein the detector is an IR camera.

14. The control system of claim 13, further comprising:
a determination unit, wherein the determination unit calculates a degree of certainty to which-the object is a pedestrian based on a value of brightness of an image captured by the detector.

15. A method for controlling a vehicle lighting device, the vehicle lighting device comprising at least two light source units for emitting light, whereby light emitted from the light source units is made to travel forward to form a high beam light distribution pattern, wherein the high beam light distribution pattern has at least two illumination patterns which illuminate areas which are different from each other, wherein one of the at least two illumination patterns is illuminated by one of at least two light source units and another of the at least two illumination patterns is illuminated by another of the at least two light source units, said method comprising:
controlling the at least two illumination patterns to be selectively turned on and off by selectively turning on and off at least one of the at least two light source units.

16. The method as set forth in claim 15, further comprising: detecting an object which lies in front of a vehicle on which the vehicle lighting device is mounted; and
controlling the at least two illumination patterns to be selectively turned on and off according to the detection.

* * * * *